United States Patent
Shields et al.

(10) Patent No.: US 11,891,179 B2
(45) Date of Patent: Feb. 6, 2024

(54) METHOD AND SYSTEM OF REMOTE EGG OILING

(71) Applicants: HARDSHELL LABS, INC., Haines, AK (US); SUNDANCE BIOLOGY, INC., Paso Robles, CA (US)

(72) Inventors: Timothy Allyn Shields, Haines, AK (US); Roy Adair Haggard, Murrieta, CA (US); Mercy Lynn Vaughn, Paso Robles, CA (US)

(73) Assignees: HARDSHELL LABS, INC., Haines, AK (US); SUNDANCE BIOLOGY, INC., Paso Robles, CA (US)

( * ) Notice: Subject to any disclaimer, the term of this patent is extended or adjusted under 35 U.S.C. 154(b) by 779 days.

(21) Appl. No.: 16/583,144

(22) Filed: Sep. 25, 2019

(65) Prior Publication Data
US 2020/0094966 A1    Mar. 26, 2020

Related U.S. Application Data

(60) Provisional application No. 62/737,028, filed on Sep. 26, 2018.

(51) Int. Cl.
*B64D 1/18* (2006.01)
*A01M 25/00* (2006.01)
(Continued)

(52) U.S. Cl.
CPC ............ *B64D 1/18* (2013.01); *A01M 25/006* (2013.01); *B64C 39/024* (2013.01); *B64D 47/08* (2013.01); *B64U 10/13* (2023.01); *B64U 2101/00* (2023.01)

(58) Field of Classification Search
CPC ... B64D 1/18; B64D 1/16; B64D 1/02; B64D 47/08; B64C 2201/12; A01M 25/006; A01M 25/00; A01K 45/00; B64U 2101/00
See application file for complete search history.

(56) References Cited

U.S. PATENT DOCUMENTS 11,065,636 B2 *   7/2021   Fideler ................. B64C 39/024
2014/0247338 A1 * 9/2014   Kessler ..................... E03F 7/12
                                                                239/289

(Continued)

FOREIGN PATENT DOCUMENTS

WO    WO-2019021265 A1 *   1/2019

OTHER PUBLICATIONS

Department of Defense, Navy, "A Remote Egg-oiling System with Autonomous and Automated Target Object Identification for Nuisance Bird Management", Released: Aug. 24, 2018, Jean Pann and Timothy Petro with Small Business Innovation and Research or SBIR (www.sbir.gov) (re: DoD 2018.3 SBIR Solicitation). (Year: 2018).*

(Continued)

*Primary Examiner* — Brady W Frazier
*Assistant Examiner* — Shanna Danielle Glover
(74) *Attorney, Agent, or Firm* — McCoy Russell LLP (57) ABSTRACT

Methods and systems are provided for remote egg oiling to control avian pest species population through reduction in nesting success. A fluid application system including an oil reservoir, an oil nozzle, a pressurization source, a camera and a targeting laser is provided for accurately dispensing oil onto a clutch of eggs in a nest that is located in hard-to-reach areas such as cliff faces, rock outcrops and artificial structures. Two aerial embodiments are disclosed.

16 Claims, 6 Drawing Sheets

(51) Int. Cl.
  *B64C 39/02* (2023.01)
  *B64D 47/08* (2006.01)
  *B64U 10/13* (2023.01)
  *B64U 101/00* (2023.01)

(56) References Cited

U.S. PATENT DOCUMENTS

| | | | | |
|---|---|---|---|---|
| 2017/0359943 | A1* | 12/2017 | Calleija | A62C 37/40 |
| 2018/0000054 | A1* | 1/2018 | Ollier | A01K 43/00 |
| 2018/0019516 | A1* | 1/2018 | Teague | H04B 7/18506 |
| 2018/0075596 | A1* | 3/2018 | Fryshman | A01M 1/22 |
| 2019/0366375 | A1* | 12/2019 | Thompson | B64C 39/02 |
| 2020/0057002 | A1* | 2/2020 | Jung | B64D 47/08 |

OTHER PUBLICATIONS

Sahagun, L., "These tortoise-killing ravens are so smart, scientists must use drones to stop them," Los Angeles Times Website, Available Online at https://www.latimes.com/local/california/la-me-raven-killing-drone-protects-desert-tortoises-20190609-story.html, Jun. 9, 2019, 13 pages.

Papenfuss, M., "Drones Mobilized To Battle Ravens Eating Baby Tortoises In California Desert," Huffington Post Website, Available Online at https://www.huffpost.com/entry/drones-ravens-baby-tortoises-california_n_5cfda2b5e4b0aab91c081d60, Jun. 10, 2019, 3 pages.

"Remote Egg Oiling: Shape of Things to Come," Hard Shell Labs Website, Available Online at https://hardshelllabs.com/services/remote-egg-oiling, Available as Early as Jun. 10, 2019, 2 pages.

Brand, M., "When ravens are killing desert tortoises, it's drones to the rescue," Press Play with Madeleine Brand, KCRW Website, Available Online at https://www.kcrw.com/news/shows/press-play-with-madeleine-brand/want-to-minimize-your-accent-theres-an-app-for-that/when-ravens-are-killing-desert-tortoises-its-drones-to-the-rescue, Jun. 18, 2019, 11 pages.

* cited by examiner

METHOD AND SYSTEM OF REMOTE EGG OILING

CROSS REFERENCE TO RELATED APPLICATION

The present application claims priority to U.S. Provisional Application No. 62/737,028, entitled "METHOD AND SYSTEM OF REMOTE EGG OILING", filed on Sep. 26, 2018. The entire contents of the above-listed application are hereby incorporated by reference for all purposes.

FIELD

The present description relates generally to methods and systems for controlling bird population through remote application of oil on bird eggs.

BACKGROUND AND SUMMARY

Controlling the numbers of pest bird species is a challenge for conservationists and wildlife managers. Usual measures include killing adult birds with firearms and poisons. Both of these options are limited by expense, their controversial nature, and the need for highly trained operators.

One method used on ground nesting birds to control population is egg oiling. By applying a thin layer of oil to the bird's eggs, gas exchange across the eggshell is inhibited, and the embryo succumbs. The eggs, being undamaged, continue to occupy the parents who, ideally, continue to care for them and lose the opportunity to re-nest.

However, there may be situations where the pest population control is required for birds having nests well above the ground, such as on cliff faces, rock outcrops, and on artificial structures including electrical transmission towers. As an example, the population of crows and ravens may need to be controlled to limit their preying on smaller animals, such as desert tortoises, a federally listed threatened species. As the approaches for ground nesting birds have been unavailable for elevated nests, various alternatives have been pursued for such birds. However, these alternatives that have involved harming the birds create still further conservation issues and may be more likely opposed.

The inventors herein have recognized the above issues, and have developed a method and system of remote egg oiling (REO) that can be applied to elevated nests. The approach enables pest species population to be controlled in a less expensive and less controversial manner than lethal control of a hatched or adult bird. In one example implementation, the approach can be enabled without requiring extensive specialized knowledge and with a lower permitting, monitoring and reporting burden than shooting or poisoning. While oil is described as one example, other liquids or gas/liquid combinations may be used, if desired. Further liquids included suspended particles and other combinations of elements may be used. Further still, powers or other solid-based compositions may be used, if desired.

An example approach for remotely oiling bird eggs includes a device based, remote fluid application, such as for example, an aerial-based remote fluid application system (RFAS). In one embodiment, the RFAS comprises a fluid reservoir, such as an oil reservoir, and a pump to drive the fluid, such as oil, through a tube to a nozzle that directs the fluid stream onto the intended subject. The nozzle and a video camera and, in some cases, a targeting laser are bundled together (hereafter also referred to as nozzle-camera-laser assembly) and may, in some examples, be mounted on a six-axis motion stabilized gimbal. The video camera provides a real time view of the nest to the operator on a dedicated video monitor. The system further includes a dedicated remote-controller for actuating the oil pump and firing the oil stream. The gimbal may be aimed via the remote-controller (RFAS controller) which may be separate from the controller used to pilot the craft (drone flight controller). The same remote-controller also triggers the oil spray. The laser, when used, provides a visual marker of the point that will be sprayed by the nozzle.

While a nozzle is described as one example, other structures may be used to apply liquid and/or a gas/liquid mixture from the remote applicator system. For example, solenoid valves may be used to deliver oil via a gravity driven supply from the on-board reservoir, such as through a tube.

In another embodiment, the RFAS comprises an air pressure vessel, instead of a pump to drive the oil or other substance through the nozzle. The vessel is pressurized to 120 psi on the ground. At the time of flight, a valve trigger present between the air pressure vessel and the oil reservoir, controls the movement of the oil stream from the reservoir to the nozzle. The system also comprises a 3D printed plastic collar that attaches the nozzle directly to the lens barrel of the stock camera on the drone. This design eliminates the need for a separate gimbal and therefore, greatly simplifies the device. The standard drone camera connection to the ground monitor is used for transmitting images, eliminating the need for a separate monitor.

In this way, a higher success rate of rendering eggs non-viable is provided in a labor and cost-effective manner. In one example, the above approach may enable a 98% success rate in rendering eggs non-viable (e.g., with 305/309 eggs failing to produce a nestling).

It should be understood that the summary above is provided to introduce in simplified form a selection of concepts that are further described in the detailed description. It is not meant to identify key or essential features of the claimed subject matter. Furthermore, the claimed subject matter is not limited to implementations that solve any disadvantages noted above or in any part of this disclosure.

Figure 2:
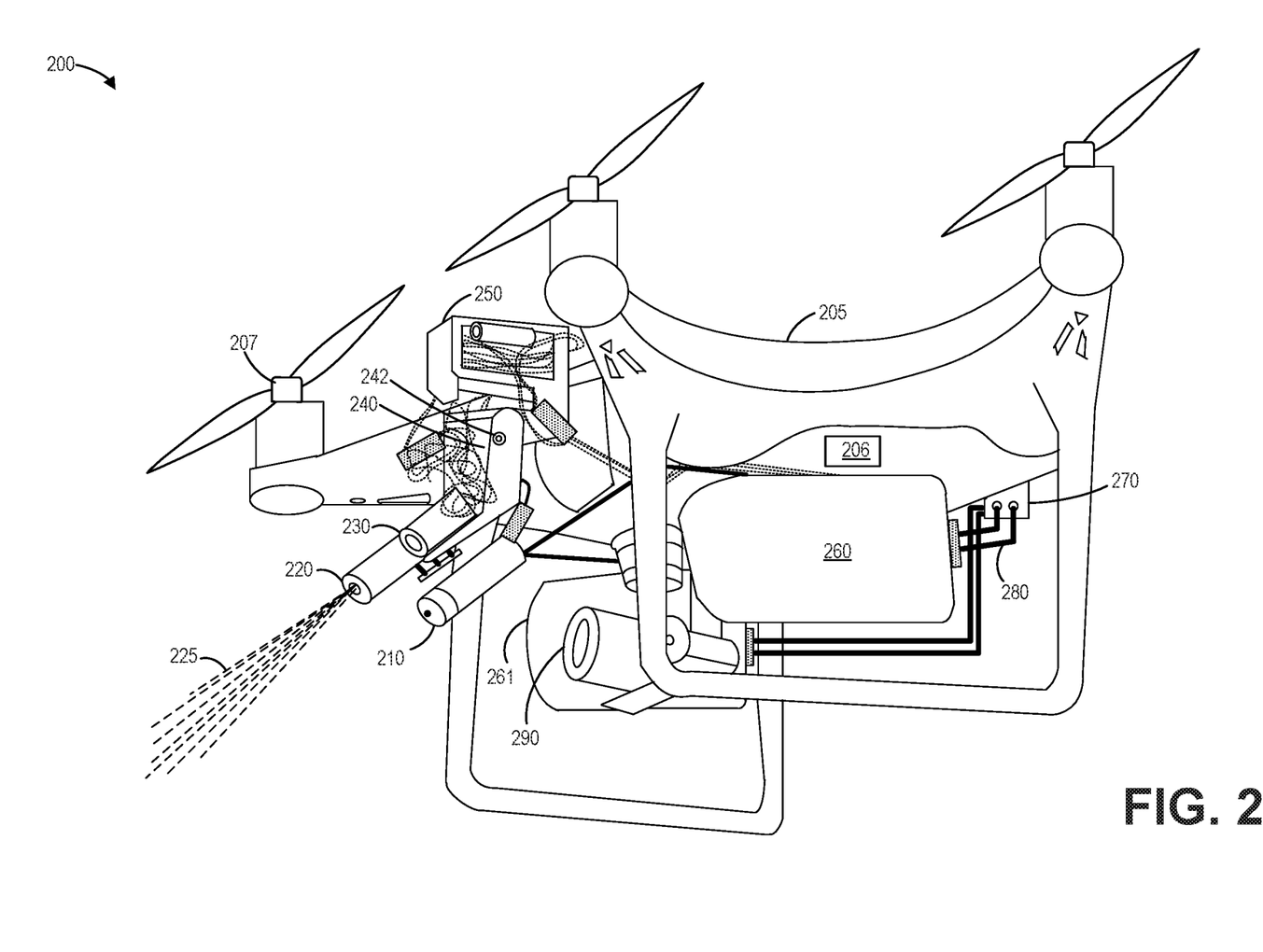
FIG. 2 shows a close-up view of example components included in an aerial RFAS, according to an embodiment of the present disclosure.
Figure 3:
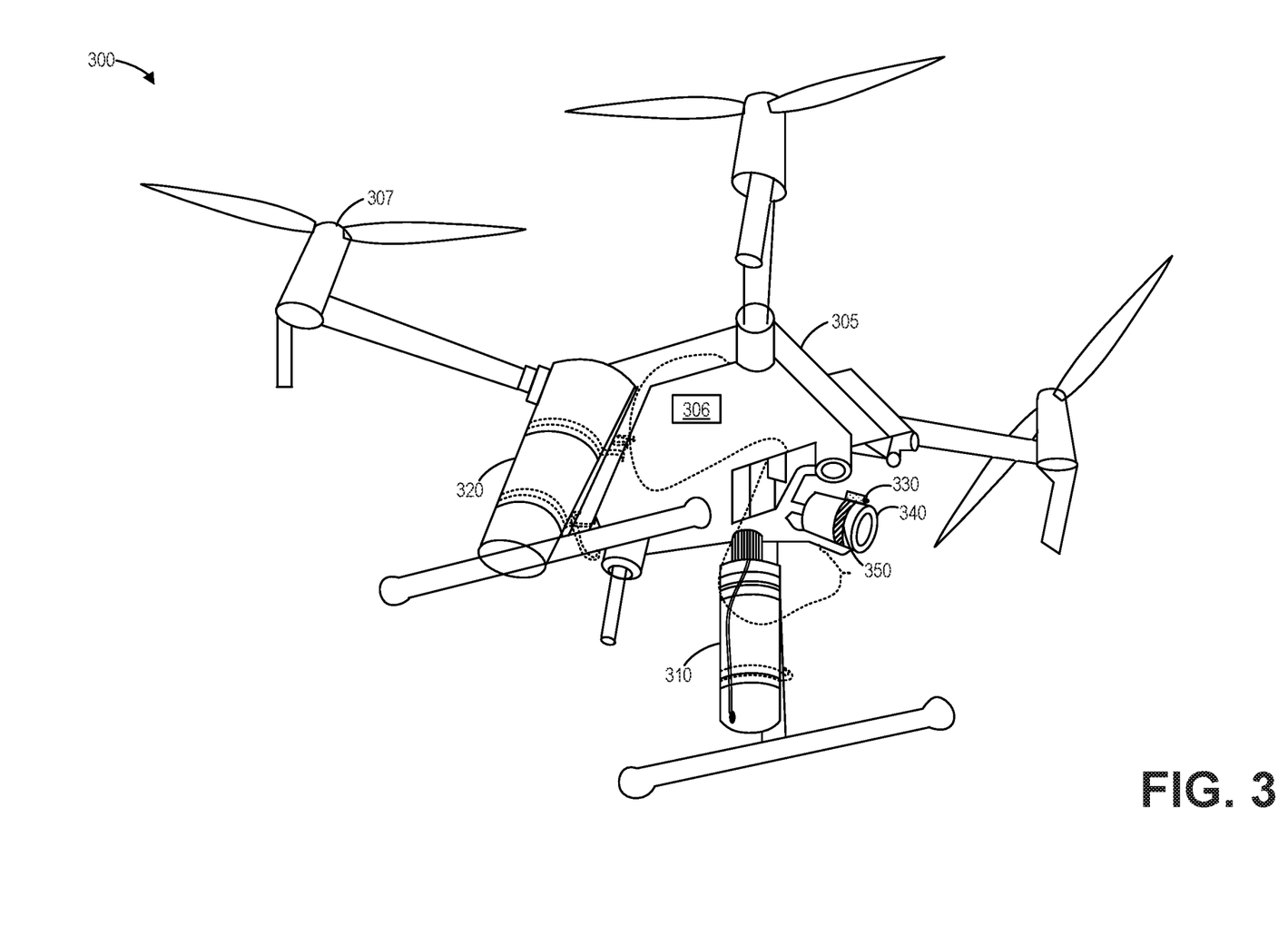
FIG. 3 shows a pictorial view of different elements of an aerial RFAS, according to an embodiment of the present disclosure.

FIGS. 2 and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

DETAILED DESCRIPTION

Figure 1:
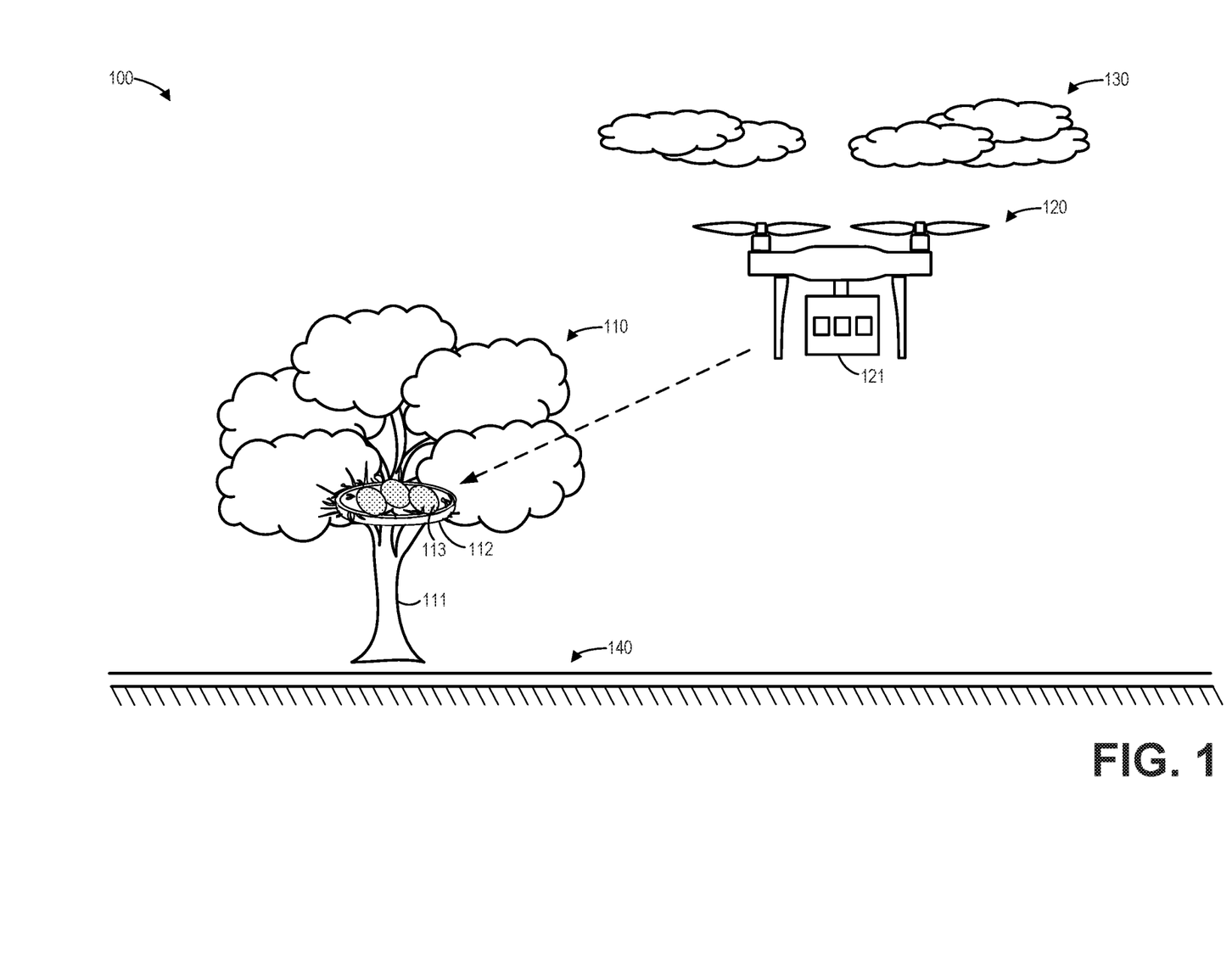
FIG. 1 schematically shows an example environment for a remote fluid application system (RFAS) including an aerial vehicle that targets elevated bird nests for remote egg oiling.
Figure 4:
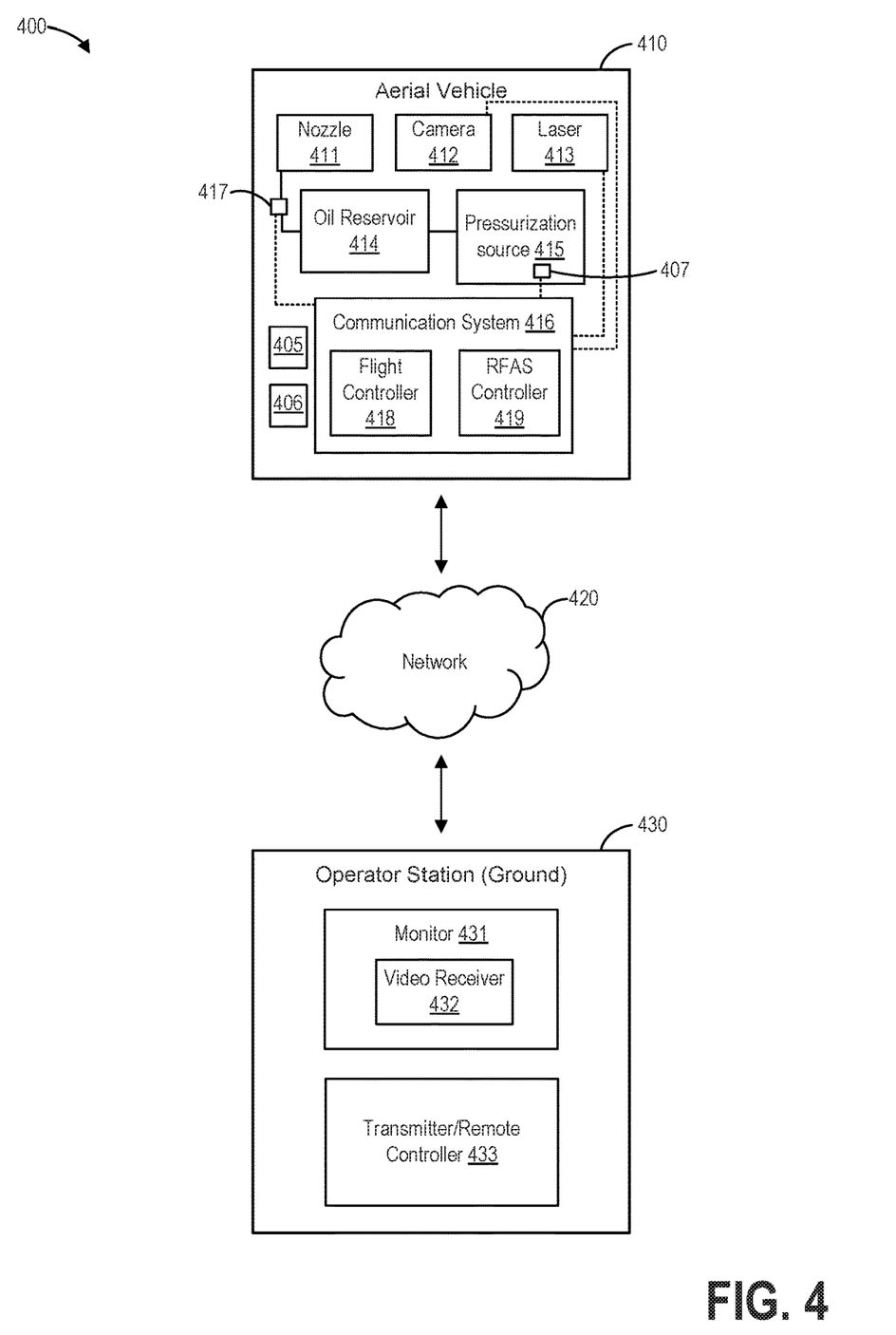
FIG. 4 illustrates an overview of an exemplary computing environment for communication between an aerial vehicle and an operator station.

The following description relates to systems and methods for remote egg oiling for population control of pest bird species. One example environment for targeting nests above the ground is depicted in FIG. 1, which may include an aerial vehicle dispensing oil directly on bird eggs. A remote fluid application system (RFAS) may be configured with a variety of components, according to the present disclosure. Two aerial embodiments of the RFAS, configured herein as drone mounted units, are shown in FIGS. 2 and 3. The systems described may utilize a computing environment as depicted in FIG. 4, which may include the aerial vehicle communicating with the operator station. A remote controller of the RFAS may be configured with instructions to execute a routine, such as the example routine of FIGS. 5 and 6, so as to identify an egg clutch for remote egg oiling, direct the nozzle-camera-laser assembly to a location of the egg clutch to spray oil thereon, and operate each of a laser, a pressurization source, and the oil nozzle in nozzle-camera-laser assembly of the RFAS to deliver an oil stream on the focused location. In this way, remote egg oiling is enabled even for nests that are difficult to reach.

FIG. 1 shows a depiction of an aerial RFAS in an example environment 100, according to an embodiment. Although, the environment is shown in the context of a nest located on a tree 110, it will be appreciated that aerial RFAS may be applied to other bird nests well above the ground 140 including, but not limited to, cliff faces, rock outcrops, building roofs, electrical transmission towers, etc.

In one example, a device, such as an aerial vehicle 120, may be disposed with a nozzle-camera-laser assembly 121. As shown in FIG. 1, aerial vehicle 120 may be configured to fly in the air 130 to dispense a fluid, such as oil, on bird eggs 113 located in a nest 112 on a tree 111. In further examples, the RFAS may be mounted on a pole or extension to enable delivery of fluid on bird eggs in an elevated nest. The device provides for a stand-alone unit that allows for remote viewing of a target and the triggering of the flow of fluid on the target.

FIG. 2 shows a close-up perspective view of the first embodiment of the aerial remote fluid application system (RFAS) 200 for remote egg oiling (REO). It involves mounting an RFAS unit, with all the associated components, beneath a commercially available unmanned aerial vehicle (UAV). In the depicted non-limiting example, the RFAS components are mounted on a DJI Phantom 4 drone for use on cliff face and rock outcrop nests. In some examples, the aerial vehicle may include a body 205, a controller 206, and a plurality of rotors 207. For example, one or more rotors may be driven by one or more motors. The motors may be powered by an on-board battery. In some examples, the RFAS unit may be mounted beneath the body.

The components included in the first embodiment of the aerial RFAS include oil reservoirs (or oil tanks) 260 and 261 of sufficient volume for at least one nest treatment. Herein, one nest treatment refers to an amount of oil required to coat a majority of eggs (e.g., more than 80% of eggs) in a single nest. In one example, the volume of the reservoir is 240 ml. In this embodiment, the two oil reservoirs 260 and 261 are positioned symmetrically on the underside of the drone 205. For example, the oil reservoir may be positioned next to the drone camera 290 on the underside of the drone, as shown. The oil reservoir may also have a level sensor communicating with the controller to enable data as to the oil level to be communicated in real time to the remote monitor/controller to enable the operator to have feedback as to whether sufficient oil is left in the reservoir to continue oiling operation.

The RFAS further includes a battery-operated pump 270 to drive the oil from the oil reservoirs 260 and 261, via tubing 280, to an oil nozzle 220 that directs the oil stream 225 onto the target (e.g., in the nest). The RFAS further includes a video camera 230 and, in some cases (such as the depicted example), a targeting laser 210. The targeting laser 210 provides a visual marker of the point in the nest (e.g., the number and position of nest eggs) that will be sprayed when oil is dispensed via the nozzle 220. By moving the laser dot over the entire clutch of eggs complete coverage is assured. As elaborated below, the video camera 230 of the RFAS is distinct from the drone camera 290 in the depicted aerial embodiment. However, in alternate aerial embodiments, a single camera may perform the function of both piloting and RFAS monitoring cameras.

The RFAS further includes a multi-axis motion stabilized gimbal 240 onto which are mounted the nozzle 220, video camera 230 and laser 210. An example mounted configuration is shown in the depicted aerial embodiment. The multiple gimbal axis pivot points 242 are also depicted. The various gimbal axis pivot points allow for the structure mounted thereon to be tilted up and down and to compensate for jarring of craft due to air turbulence. In one example, the RFAS components shown in FIG. 2 may be mounted on a DJI Matrice M-200 drone. The laser 210 is coupled to the nozzle 220 in nozzle-camera-laser assembly such that any adjustments to the position of the nozzle result in corresponding changes to the position of the laser. Specifically, the laser 210 is positioned coaxial to the nozzle 220. In one example, the nozzle 220 is mounted on the gimbal 240 and the laser 210 is mounted below it such that they share a common gimbal pivot point.

In this aerial embodiment, the gimbal 240 is a motor-driven, remotely controlled gimbal that is used to aim the nozzle-camera-laser assembly at the eggs in the nest. In one example, the gimbal motor is a brushless DC motor that enables direct drive angular positioning of the components mounted on the gimbal. Alternatively, the gimbal motor may be a servo motor. The gimbal includes a servo-stabilized sprayer platform which houses a plurality of servos or motors which are responsible for varying gimbal roll and pitch. Additional servo or motors may be provided for pitch axis adjustment as target range varies to compensate for stream drop. For example, a gyro servo may be included for autonomous gimbal stabilization on the roll and pitch axis. As another example, another servo may be provided for controlling the yaw axis. As elaborated below, by operating the motor and varying a position of the gimbal relative to its axis pivot points, a "tilt" position of the nozzle-camera-laser assembly mounted on the gimbal can be varied. One or more gimbal dampers may be included to mitigate the effect of the vibration from the drone affecting the components mounted thereon. The system also provides for stability in turbulent air conditions, compensating for sudden motion by the drone on any axis.

A gimbal frame with compartments may be provided to house various RFAS electronics such as a video transmitter to transit wireless video from the gimbal to an operator, a gyro servo for autonomous gimbal stabilization on the roll and pitch axis, various relays and switches, a capacitor to reduce voltage drop when multiple controls inputs are simultaneously commanded, etc.

A power distribution assembly 250 may also be included in the RFAS for adjusting the amount of power directed to the gimbal motor. The power distribution assembly may include one or more batteries to power the RFAS system, a power switch to enable or disable power transfer from the battery to camera, laser, gimbal or oil pump, a power distribution board, an adjustable step up voltage regulator for fluid pump adjustment, a voltage regulator for powering RC system, servos, oil pump, gimbal controller, and laser sight. The voltage regulator may provide different voltage outputs to meet the different voltage requirements if the components, such as a 5V voltage regulator for the radio controllers and a 12V output regulator for wireless video transmission.

FIG. 3 shows a close-up perspective view of the second embodiment of the aerial RFAS 300 for remote egg oiling (REO). In the depicted non-limiting example, the RFAS components are mounted on a DJI Phantom 4 drone. In some examples, the aerial vehicle may include a body 305, a controller 306, and a plurality of rotors 307. For example, one or more rotors may be driven by one or more motors. The motors may be powered by an on-board battery. In some examples, the RFAS unit may be mounted beneath the body.

The RFAS components included in this embodiment are similar to those shown in the first embodiment with some alterations. An oil reservoir 310, containing a sufficient volume of oil for at least one nest treatment, is positioned on the underside of the body 305 of the aerial vehicle. Herein, one nest treatment refers to an amount of oil required to coat a majority of eggs (e.g., more than 80% of eggs) in a single nest. In the depicted embodiment, a single camera 340 is used for both piloting as well as RFAS monitoring. However, in alternate aerial embodiments, two distinct cameras may perform the two different functions of piloting and RFAS monitoring. In one example, the system may also include a targeting laser (not shown).

In this aerial embodiment, the oil pump is replaced by an air pressure vessel 320 to provide pressure to drive oil through the nozzle 330. The vessel 320 may be positioned on the underside of the drone 305 opposite to the oil reservoir 310, as shown. Alternatively, it may be positioned anywhere on the aerial vehicle. In one non-limiting example, the air pressure vessel is pressurized to around 120 psi on the ground using a bicycle pump with an air pressure gauge. A valve trigger (not shown) present between the air pressure vessel 320 and the oil reservoir 310 may control the flow of oil through the nozzle 330. In some examples, opening the valve forces the compressed air out which draws oil from the oil reservoir. For example, the air pressure may drive oil out through a tube at the bottom of the reservoir. In other examples, the oil may be mixed with the compressed air to create a mist that comes out of the nozzle.

The RFAS in the depicted embodiment further includes a collar 350 that attaches the oil nozzle 330 directly to the lens barrel of the camera 340. In one example, the collar may be a simple 3D printed plastic material, as shown. This plastic collar 350 replaces the gimbal 240 shown in the first aerial embodiment in FIG. 2, thereby greatly simplifying the RFAS unit.

FIG. 4 illustrates an overview of an exemplary computing environment 400 depicting communication through a network 420 between an aerial vehicle 410 and an operator station 430. Images captured by the drone camera as well as those captured by the RFAS camera, if present, are transmitted to a monitor 431 for display to an operator at the operator station 430. The monitor 431 may include a built-in wireless video receiver 432. Other modes of image transmission are also possible. In one example, the video monitor may include a shading hood for ease of viewing in harsh sunlight (not shown).

Prior to an egg oiling operation/mission, the oil reservoir 414 of the aerial vehicle 410 is loaded with oil (e.g., by manually adding oil to the oil tank) and flown to a position above the nest that provides a clear view of the eggs. A first controller, the drone flight controller 418, may receive instructions for flying the aerial vehicle 410 from an operator at the operator station 430. The control instructions are received via a remote controller or transmitter 433. The flight controller of the drone enables a "pan" or side-to-side orientation of the RFAS to be established. In one example, a camera 412 of the drone is used to collect wide-angle images of a nest and its environs and is used principally for obstacle avoidance and positioning the drone relative to the nest. These images are transmitted via the flight controller 418 to the drone operator, such as to the monitor 431 at the operator station 430, and based on the images, the operator may select a position to "park" the drone, relative to the nest. The operator may adjust the drone position via controls provided on the remote control or transmitter 433, communicatively coupled to the aerial vehicle unit 410. By adjusting the controls, a speed or torque of the various propellers of the drone may be varied, so as to fly the drone to an appropriate location. A second and narrower view video camera, mounted on the RFAS itself according to the first embodiment shown in FIG. 2, is used for precise aiming of the oil stream once the firing location is reached. Alternatively, the drone camera can also be used for this function as disclosed in the second embodiment depicted in FIG. 3.

The positional stability of the drone allows it to be "parked" in midair above the nest at a location from which the RFAS can be aimed. Once the drone is "parked", a "tilt" or up-and-down orientation of the RFAS, specifically the nozzle-camera-laser assembly, is enabled via a second controller, the RFAS controller 419, distinct from the flight controller 418. The RFAS controller 419 may be configured with instructions for operating one or more gimbal motors so as to alter a tilt position (and/or one or more of roll, yaw, and pitch) of the gimbal, thereby altering the angle of the camera and the nozzle. In one example, the camera 412 and nozzle 411 are assembled and mounted together on the gimbal as a camera-plus-nozzle assembly. Further, the targeting laser 413 may be included in the nozzle-camera-laser assembly coaxially such that they all pivot in concert. In other words, as the gimbal is moved, and the image provided by the video camera changes, and the focal point of the nozzle changes in accordance. As a result, the image provided by the RFAS video camera indicates the area within which the focal point of the nozzle lies. The video camera coupled to the gimbal transmits images of the target. In another example, the drone camera coupled to the nozzle by a plastic collar may be used to achieve the same function. Concurrently, the laser dot, if used, indicates the location on the target where an oil stream would hit when the oil nozzle is operated. The images are transmitted from the FAS camera to an operator, such as by displaying the images on the monitor. The operator can then adjust a position of the nozzle-camera assembly based on the displayed images to vary the target location and/or vary the area onto which oil is expected to be released. In addition to a tilt function that is always included in the aerial embodiments, an additional pan function may also be integrated into the RFAS to allow for fine tuning of compass direction (pan) without having to alter the position of the drone. This may be especially desirable when having to "play" the stream over the eggs to achieve complete coverage of the clutch.

When a proper aim is achieved, such as when a suitable portion of the eggs in a nest can be oiled, the operator may actuate the oil nozzle. Specifically, based on input received from the RFAS operator, who may be the same operator that is flying the drone, or a distinct operator, the input received via a remote control, a final position of the nozzle-camera-laser assembly is fixed. Further based on the position, a final determination to oil or not oil is made and a trigger is actuated by the operator if a decision to dispense the oil is made. The trigger actuates the pressurization source 415 to dispense oil to the nozzle, and actuates the nozzle 411 to release the dispensed oil.

As depicted in FIG. 4, the pressurization source 415 may include a pressure sensor 407. In some examples, the pressure sensor 407 may be coupled to the pressurization source 415, such as an air pressure tank. In one example, the air pressure tank includes a pressure sensor that communicates with flight controller 418 or RFAS controller 419 to indicate a pressure level in the tank, which can be communicated to a remote monitor 431 to enable an operator to identify when the tank is below a threshold pressure, below which oil may not be effectively sprayed from the nozzle.

As shown in FIG. 4, an actuator 417 such as a solenoid valve may be present between the oil reservoir and the nozzle that may control the movement of the oil from the reservoir to the nozzle. The actuator 417 may be powered by a battery 405. When the trigger is actuated, a signal may be sent to the RFAS controller 419 from the operator station 430 (e.g., via the network 420). When the RFAS controller receives the signal, the RFAS controller 419 may send a command to the actuator 417 to adjust (e.g., open) the actuator 417 in order to fluidly couple the nozzle 411 to the oil reservoir 414. Follow-up still images are captured by the camera after the oil stream is released to allow careful examination after the mission of whether the desired number of eggs were oiled, and/or if the selected eggs were sufficiently oiled (e.g., a sufficiently thick coat of oil has been achieved on all the targeted eggs). In other words, the camera is used to make a real time determination as to the thoroughness of the oil treatment. The drone camera is then used by the operator to adjust the drone controls so as to navigate the drone back to a location where the oil reservoir can be reloaded.

In some examples, battery 405 may be coupled to a motor 406 to drive flight control mechanisms or otherwise power components of the vehicle. For example, the battery 405 may be configured to power the motor 406 to drive the rotors of an aerial vehicle when commanded by the flight controller 418.

In one example, at least the FAS controller used for aiming and firing the oil stream is a dedicated remote-controller. Further, the first controller for flying the UAV may be another dedicated remote-controller. One or more of the remote controllers may be radio-controllers. Still other modes of control are possible, such as via wireless or Bluetooth communication (e.g., WiFi control).

In one example of the aerial embodiment of a RFAS, the servo stabilized sprayer platform includes two Hitec HS-225 digital servos for gimbal roll and pitch. Another servo or motor may be provided (not shown) for pitch axis adjustment as target range varies to compensate for stream drop. Pitch adjustment may be enabled via a Dymond D4.7 BB micro servo. One example camera that may be used in the RFAS is a 1000tvl CCTV video camera with an 8 mm lens. An example targeting laser that may be used in the RFAS is a 50 mw 532 nm green laser diode for sprayer sighting. A gimbal frame (e.g., a G-10 gimbal frame) may be included with compartments to house various RFAS electronics. Example RFAS electronics include a 532 nm laser driver and voltage regulator for laser sight, a 600 mw 5.8 ghz video transmitter to transmit wireless video from the gimbal to the operator, a radio controlled (RC controlled) 10A relay switch to turn the laser on and off. Further, a gyro servo controller may be included for autonomous gimbal stabilization on the roll and pitch axis. Still another servo, such as the Hitec HS-65 mg servo, may be used for controlling yaw axis. A capacitor may be used to reduce voltage drop when multiple control inputs are simultaneously commanded. In one example, the transceiver is a Flysky FS-iA6B 6 channel 2.4 ghz receiver. The sprayer nozzle may use, as one example, blunt fill hypodermic needles to achieve a desired stream, such as an 18 awg. The gimbal mount may be a quick release gimbal mount with ¼" bearings for precise yaw movement.

In one example, the power distribution assembly includes 1000 mAh 3 cell lithium polymer battery to power RFAS system, a 10-amp system power switch, a power distribution board, an adjustable step up voltage regulator for fluid pump adjustment, a 5V voltage regulator for powering RC system, servos, gimbal controller, and laser sight. Further, a 12V output may be included for wireless video Transmitter. An RC controlled 10A relay switch may also be included for the fluid pump.

Figure 5:
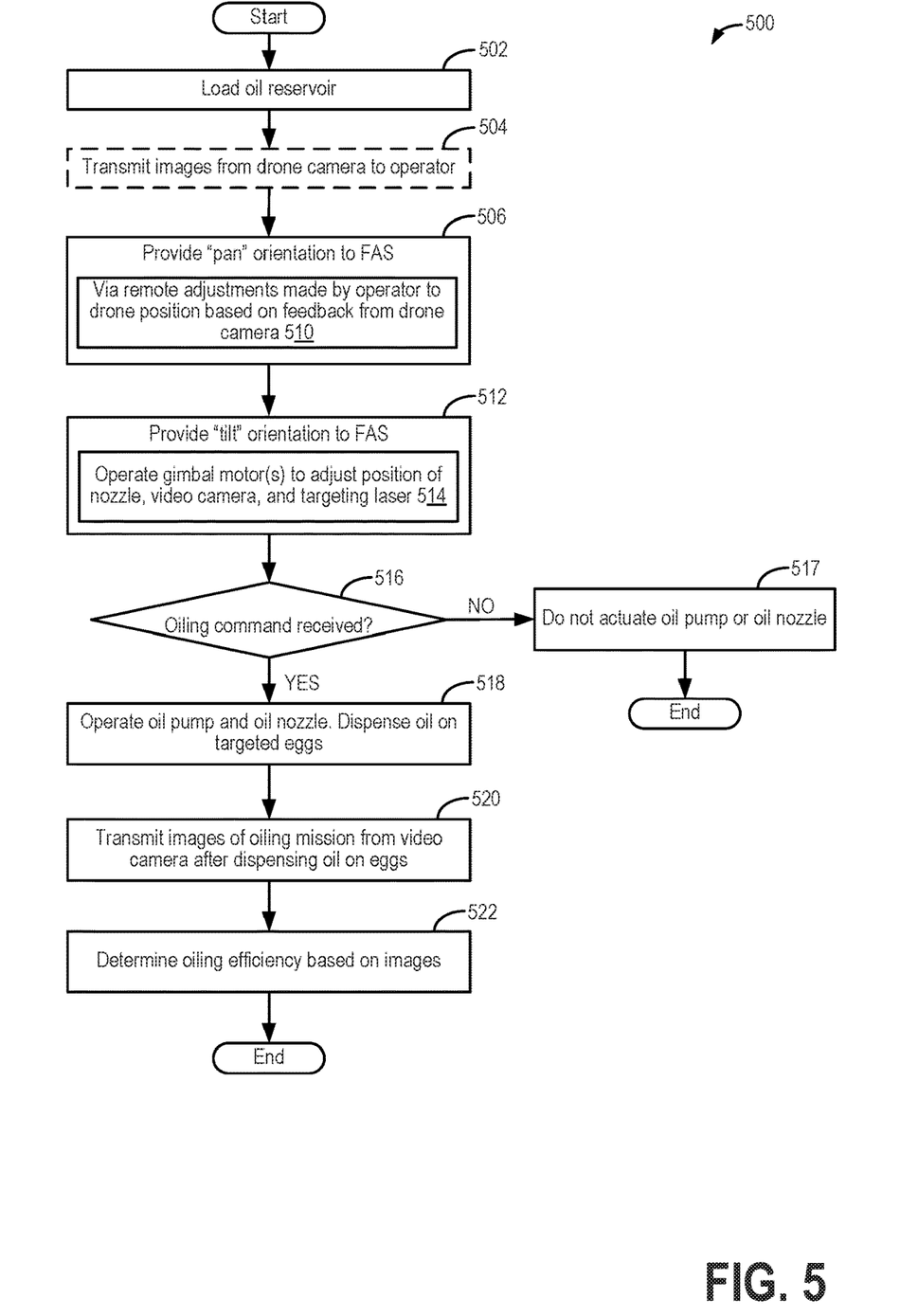
FIG. 5 shows a high-level flow chart of an example method for remotely oiling eggs of an egg clutch via a fluid application system comprising a pump, according to an embodiment of the present disclosure.

In one example, the RFAS operator station includes a 1.8" HD daylight visible monitor with built in 5.8 ghz wireless video receiver, a tripod with dual monitor mounts for RFAS and M200 operator monitors, a Flysky FS-I6S 10 ch 2.4G RC Transmitter for RFAS system used to control the following actions: laser sight on/off; Sprayer on/off; Gimbal yaw and pitch control for aiming sprayer/oil nozzle; sprayer finite vertical trim adjustment to adapt for target distance changes; and control of the video camera for observing potential hazards above the drone.

In one example, the fluid pump assembly includes dual 16 oz tanks to reduce CG changes as dispensed, a 3/16" silicone tubing used for plumbing, and a ⅛" actuator valve for fluid tank ventilation to spray and close when sprayer is off so fluid does not drain due to head pressure of tanks being mounted above spray nozzle for drone CG optimization. Further, a 6V regulator may be included for actuator valve operation.

Although described in regards to spraying oil on bird eggs as a non-limiting example of the remote fluid application system according to the present disclosure, the fluid application system further may include application of one or more alternative fluids, alone or in combination, including paint or staining materials, pesticides or water. Fluid reservoirs may hold the fluid for delivery by the delivery system as described herein. The system provides for remote viewing of a target area and precise delivery of a desired liquid.

Various aspects and challenges were taken into consideration in the design of the RFAS. The constraints were stringent; however, choices were made in order to optimize the total design.

A first aspect that was taken into consideration was the weight of the RFAS. Since the RFAS is slung beneath a laboring aircraft, light weight is essential. The need for low weight constrains the choice of materials and components. For instance, a smaller oil pump, being lighter, is required. Thus, the smaller the pump the better. The small pump size (and therefore lower pump output) necessitates the use of a thinner oil. More viscous oils are harder to drive through the tubing and nozzle. However, the thinner oil is more susceptible to being blown around by wind gusts. Therefore, weight constraints had to be balanced with the need for a coherent and tight stream of oil. These constraints were also factored in to drive the choice of oil nozzle.

Another factor that was taken into consideration was the center of gravity of the RFAS assembly. In both the designs, a compact FAS was needed. Long moment arms, such as the use of an extended arm for oil delivery, adversely affected the center of gravity factor. In particular, aerodynamic problems associated with the long arm drove the inventors to the "flying squirt-gun" approach that is shown in the depicted embodiments. The RFAS requires a centered mass as well as a mass that maintains its centering as oil drains during REO treatment.

Another factor was payload. Sufficient oil is needed to adequately treat at least one nest, but higher capacity is desirable as the oil loading process is time consuming and potentially messy. However, the oil is heavy so carrying excess oil aloft can be an issue. Striking a balance to optimize payload constraints was an important factor in the final design of the RFAS.

Yet another factor was the range of physical reach (e.g., ground to nest vicinity). In all cases, using the simplest version of the RFAS is desirable. An entire class of nests, such as those on utility towers, can be accessed only by an aerial vehicle for oiling eggs. For a number of reasons these tower nests are one of the highest priority targets for REO and a lot of technological development has been dedicated towards this application.

Still another factor is the range of oil delivery (RFAS to target). The RFAS involves driving the oil through a nozzle and projecting it through the air to the eggs. At a minimum this is 18" but it was desirable to maximize the range of accurate delivery of the oil. In some cases, nests are recessed several feet into cavities in cliff faces. The high stakes of oiling nests on utility towers makes a long stand-off distance very desirable as it will reduce the potential for untoward interactions with the towers and cables.

Still another factor is the compatibility of electronics. The RFAS has its own dedicated remote control unit (which in one example may be a radio controller) and interactions with the control unit of the drone (drone controller) need to be minimized. The control system for the RFAS was chosen with this in mind to limit the possibility of affecting drone controls due to interference from the RFAS controller.

Yet another factor was high electromagnetic field (EMF) strength. Operations in proximity to high tension power lines involve high strength EMF and hardening of drone control electronics was an important factor in the choice of the drone used. Choosing a drone with this sort of hardening was essential in creating a system capable of tower nest oiling.

Still another factor was the quality of camera feed. A clear feed from the video camera to the video monitor used by the payload operator is necessary since the images are used to locate the nest, do a final count of eggs, to track the progress of the oiling, as well as to assess its thoroughness after oiling.

Further consideration was made as to field conditions. The RFAS is used in field conditions and frequently in very remote locations. Durability and reliability are thus top design priorities. The following factors were considered: temperature was considered as components were required to operate over a wide range of temperatures, including air temperatures over 100 degrees F.; terrain was considered as devices are often carried over very rugged terrain, such as rugged slopes, requiring the RFAS to be sufficiently stout to survive bumps and drops.

In some examples, and as described earlier, the RFAS may be incorporated as part of a pole or vertical extension, such as for example, a telescoping extension. In such examples, the pole version of the RFAS may include a body, a pole, a fluid reservoir and a delivery system. The pole version may be configured to extend through branches of trees and receives and/or accommodate jolts in the process. In some examples, the pole may be attached to a rover, such as a terrestrial rover.

Wind is another factor for all RFAS versions. Compact design reduces wind resistance and extends the range of conditions over which operations can be conducted. Higher winds carry dust and sand. Sealing the RFAS to insulate sensitive components from particles is desirable to extend the life of the units.

Harsh light is yet another factor. Video systems must deliver a clear view of the nest for egg counting, accurate aiming of the oil stream, and reliable assessment of the treatment. Camera and monitor must be chosen with the challenge of very harsh midday light in mind.

Oil handling ability is yet another consideration. Loading oil is potentially messy and wind blows oil droplets around during nest treatment. Oil splashes off treated surfaces and back onto the RFAS and delivery device. Minimizing unintended oil distribution and ease of cleanup were important considerations.

Turning now to FIG. 5, an example method 500 is shown for operating an aerial RFAS comprising an oil pump as the pressurization source. The method may be used to enable remote egg oiling with high accuracy.

At 502, the method includes loading the oil reservoir. For example, an operator may manually fill a selected oil into the oil reservoir. The size of the oil reservoir and the viscosity of the oil may be selected based on the location of the target (e.g., whether cliff face or rock outcrop or power line tower), the nature of the target (e.g., whether crow, raven, gull or cormorant eggs, etc.). The amount of oil loaded in the reservoir may be sufficient for one or more egg oiling missions.

At 504, images are transmitted from the drone camera to an operator. Specifically, as the drone is guided to a location, images of the location including a view of the nest with the egg clutch, is sent to the operator. The operator can then "park" the drone at a position from where oil can be dispensed so as to cover most of the target.

At 506, the method includes adjusting a "pan" orientation of the RFAS. Adjusting the pan orientation includes adjusting the side-to-side orientation of the camera assembly. The panning function may be provided through drone orientation or can be done with a pan function on the RFAS and includes, at 510, performing remote adjustments to the drone position based on feedback from the drone camera. Herein, the images received from the drone camera (at 504) are used by the operator to control the drone propellers and navigate the drone to a position from where oil can be dispensed effectively. It will be appreciated that the RFAS may be configured to include a side to side adjustment, such as via adjustments to a gimbal motor. Thus, a gross control of drone orientation can get the RFAS roughly pointed toward a target nest and a finer pan control on the RFAS can enable easy and quick changes in orientation. This is especially useful in "panning" across an egg clutch in the targeted nest. Since the stream of oil needs to play over the eggs to assure coverage, a pan function on the RFAS enables easier playing than having to pan by adjusting yaw on the drone.

At 512, the method includes adjusting a "tilt" orientation to the RFAS. Adjusting the tilt orientation includes adjusting the top-to-bottom orientation of the camera assembly. The tilting includes, at 514, operating the one or more gimbal motors to adjust a position of the conjoined nozzle, video camera, and targeting laser assembly. By operating the gimbal motor(s), the gimbal can be rotated about one or more pivoting axes. As the gimbal rotates about pitch, roll and yaw axes, the target of the nozzle changes, which can be learned based on the images provided by the coaxial RFAS video camera. In addition, by operating the laser, a target aiming point of the nozzle can be visualized. At 516, it is determined if an oiling command has been received. In one example, based on the images provided by the video camera and the target area indicated by the targeting laser, it may be determined (by the operator) if a sufficient number of eggs (or a sufficient region of the clutch of eggs) are likely to be covered in oil. If yes, then the operator may actuate a trigger, commanding the oiling mission.

If a sufficient area or number of eggs are not expected to be covered, then the operator may choose to not actuate the trigger, thus an oiling command is not received. In this event, at 517, the method includes not actuating the oil pump and oil nozzle. In other words, oil is not dispensed from the RFAS. Optionally the method may return to 506 and/or 512 to vary the pan and tilt position of the RFAS to optimize the oiling area.

If an oiling command is received, then at 518, the method includes operating the oil pump and oil nozzle. As a result, oil is dispensed from the RFAS onto the targeted eggs. At 520, the method includes transmitting follow-up images of the oiling mission from the video camera to the operator. At 522, based on the images, an oiling efficiency is determined. For example, it is determined if a sufficient number of eggs were actually covered, and/or if the oil layer on the targeted eggs was sufficiently thick.

In one example configuration, the spatial positioning of the various components with respect to each other enables improved delivery of an appropriate amount of oil, with an appropriate spray pattern coverage, without over-spraying and/or damaging the nest. Further, the particular configurations described herein, enable accurate delivery by reducing the impact of the reaction forces and weight changes caused by fluid delivery on the chosen delivery structure.

Figure 6:
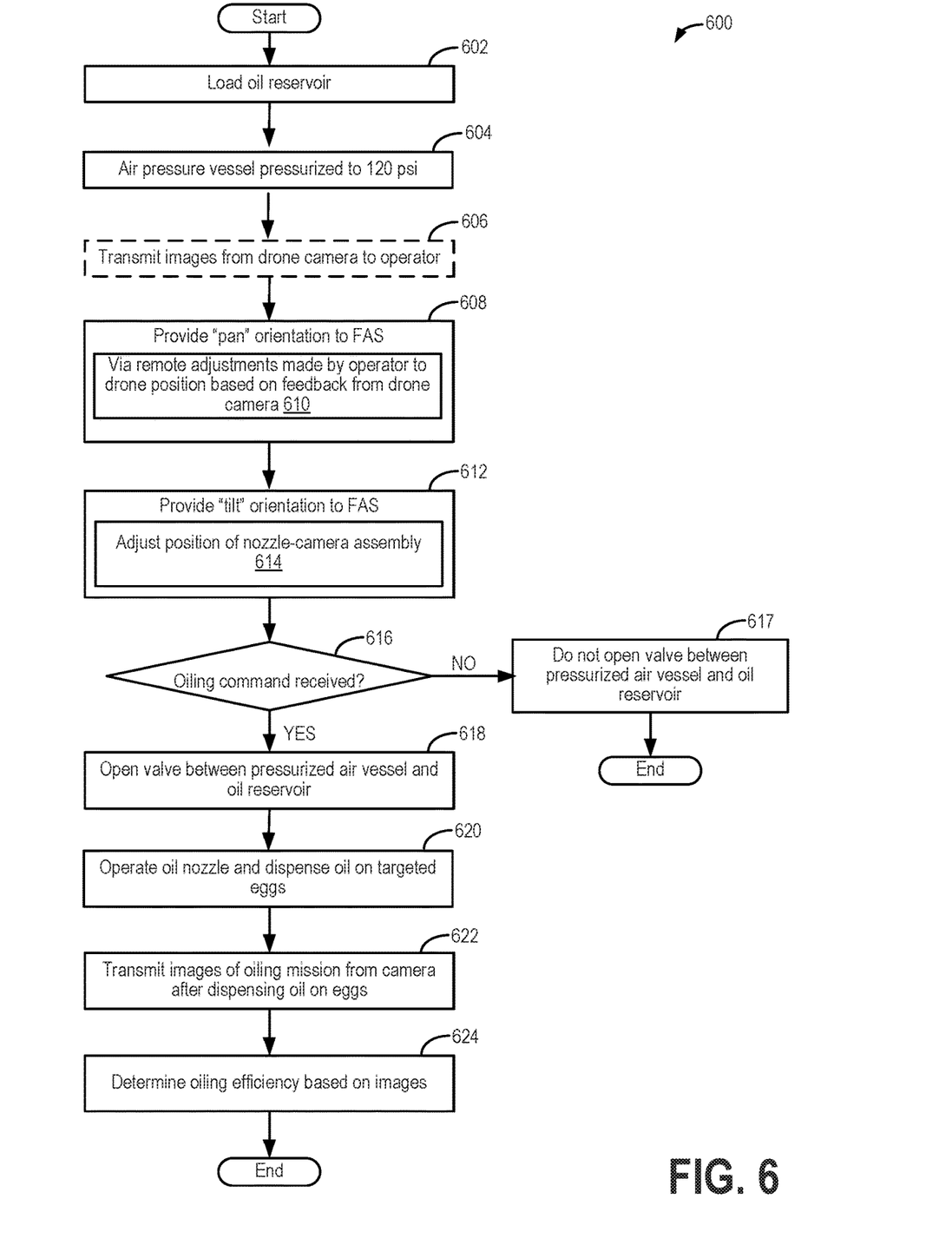
FIG. 6 shows a high-level flow chart illustrating an example method for remotely oiling eggs via a fluid application system comprising an air pressure tank, according to an embodiment of the present disclosure.

Turning now to FIG. 6, an example method 600 is shown for operating an aerial RFAS comprising an air pressure vessel as the pressurization source. The method may be used to enable remote egg oiling with high accuracy. The method steps introduced previously with reference to the method depicted in FIG. 5 may be similarly used in this case with some alterations. The basic formula for remote egg oiling remains the same.

At 602, the method includes loading the oil reservoir. For example, an operator may manually fill a selected oil into the oil reservoir. The size of the oil reservoir and the viscosity of the oil may be selected based on the location of the target (e.g., whether cliff face or rock outcrop or power line tower), the nature of the target (e.g., whether crow, raven, gull or cormorant eggs, etc.). The amount of oil loaded in the reservoir may be sufficient for one or more egg oiling missions.

At 604, the method includes pressurizing the air pressure vessel. For example, an operator may pressurize the air pressure vessel to around 120 psi on the ground using a bicycle pump with an air pressure gauge.

At 606, images are transmitted from the drone camera to an operator. Specifically, as the drone is guided to a location, images of the location including a view of the nest with the egg clutch, is sent to the operator. The operator can then "park" the drone at a position from where oil can be dispensed so as to cover most of the target.

At 608, the method includes adjusting a "pan" orientation of the RFAS. Adjusting the pan orientation includes adjusting the side-to-side orientation of the camera assembly. The panning function may be provided through drone orientation or can be done with a pan function on the RFAS and includes, at 610, performing remote adjustments to the drone position based on feedback from the drone camera. Herein, the images received from the drone camera (at 504) are used by the operator to control the drone propellers and navigate the drone to a position from where oil can be dispensed effectively.

At 612, the method includes adjusting a "tilt" orientation to the RFAS. Adjusting the tilt orientation includes adjusting the top-to-bottom orientation of the camera. The tilting includes, at 614, adjusting the position of the nozzle-camera assembly such that it points towards the targeted eggs. In addition, by operating the laser (if present), a target aiming point of the nozzle can be visualized.

At 616, it is determined if an oiling command has been received. In one example, based on the images provided by the camera and the target area indicated by the targeting laser, it may be determined (by the operator) if a sufficient number of eggs (or a sufficient region of the clutch of eggs) are likely to be covered in oil. If yes, then the operator may actuate a trigger, commanding the oiling mission.

If a sufficient area or number of eggs are not expected to be covered, then the operator may choose to not actuate the trigger, thus an oiling command is not received. In this event, at 617, the method includes not opening the valve between the pressurized air vessel and the oil reservoir, thereby not actuating the oil nozzle. In other words, oil is not dispensed from the RFAS. Optionally the method may return to 608 and/or 612 to vary the pan and tilt position of the RFAS to optimize the oiling area.

If an oiling command is received, then at 618, the method includes opening the valve between the pressurized air vessel and oil reservoir. At 620, the oil nozzle is operated. As a result, oil is dispensed from the RFAS onto the targeted eggs. At 622, the method includes transmitting follow-up images of the oiling mission from the camera to the operator. At 624, based on the images, an oiling efficiency is determined. For example, it is determined if a sufficient number of eggs were actually covered, and/or if the oil layer on the targeted eggs was sufficiently thick.

In this way, a fluid application system is provided for remote egg oiling with increased accuracy and range of oil delivery. Through accurate delivery of oil to eggs the system enables reduction in the volume of oil needed for nest treatment. Via training, a steady increase in the ease of operation of the system by an operator may be provided. The RFAS may be created with reduced cost of components. Although, two different aerial embodiments are disclosed in the present disclosure, by integrating improvements in drone technology, the RFAS may be adapted to a wide range of aerial platforms. By improving the reliability, durability and simplicity of the system, the ability of the system to survive in field conditions is increased. This improves the overall performance of the system in remote egg oiling.

As described above, a device including a body, an oil reservoir to store oil, an oil delivery system to deliver oil from the oil reservoir to external to the body; and a pressurization source that drives oil from the reservoir to the delivery system is provided. In some examples, the device may be an aerial vehicle.

In some examples, the pressurization source of the device may be a pump. The pressurization source may further be an air pressure tank, where the air pressure tank may be configured to be refilled with pressurized air. In other examples, the device may not include a pump.

As described, the device may further include a controller for receiving commands to actuate the oil delivery system. The oil delivery system further comprises a nozzle for dispensing pressurized oil onto a target.

Additionally, the device may include a camera for image transmission to a ground monitor. In some examples, a 3D printed plastic collar may attach the nozzle to the camera. Further, the device may include a laser to provide a visual marker of a position of the target. A multi-axis motion stabilized gimbal may be provided onto which the nozzle, the camera, and the laser may be mounted. In some examples, the laser may be coupled to the nozzle such that adjustments to a position of the nozzle result in corresponding changes to a position of the laser.

As another example, an aerial vehicle is provided including a body with a plurality of rotors, a controller, a battery powering motors of the rotors, an oil reservoir to store oil, a nozzle coupled to the oil reservoir, and an actuator to open and close the nozzle powered by the battery and coupled to the controller. The vehicle may further include a pressurized gas tank coupled to the oil reservoir and pressurizing the oil in the reservoir. A pressure sensor may be coupled to the pressure reservoir. As described above, the vehicle may include a laser and a camera.

In some examples, there may be no oil pump on board the vehicle. In other examples, there may be no air pump on board the vehicle.

As another example, a method of oiling bird eggs by a remote fluid application system (RFAS) to control avian pest species population is provided. For example, the method may include loading an oil reservoir of the RFAS with oil and pressurized air, flying the aerial vehicle to a position near an egg target, remotely operating a gimbal motor of the RFAS to adjust a position of a nozzle of the RFAS, and dispensing oil on the egg target by fluidly coupling the oil reservoir to the nozzle. In some examples, the egg target may be located at an elevation substantially above the reach from a human on the ground.

In some example methods, fluidly coupling the oil reservoir to the nozzle includes adjusting an actuator coupled between the oil reservoir and the nozzle in response to a command from an operator station. In other examples, the method may include determining an oiling efficiency based on images of the targeted eggs acquired by a camera of the RFAS where the images may be transmitted by the aerial vehicle to a ground monitor, and where the method further provides adjusting subsequent dispensing of oil responsive to the monitoring.

This written description uses examples to disclose the invention, including the best mode, and also to enable a person of ordinary skill in the relevant art to practice the invention, including making and using any devices or systems and performing any incorporated methods. The description of embodiments has been presented for purposes of illustration. Suitable modifications and variations to the embodiments may be performed in light of the above description.

The subject matter of the present disclosure includes all novel and non-obvious combinations and sub-combinations of the various structures and configurations, and other features, functions, and/or properties disclosed. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A conservation method, comprising:
oiling bird eggs by a remote fluid application system (RFAS) to control avian pest species population, the RFAS coupled to an aerial vehicle, including:
  loading an oil reservoir of the RFAS with oil and pressurized air;
  operating an RFAS camera coupled in the RFAS;
  flying the aerial vehicle to a position near an egg target, the aerial vehicle having a drone camera distinct from the RFAS camera;
  remotely operating a gimbal motor of the RFAS to adjust a position of a nozzle and the RFAS camera of the RFAS to the egg target;
  determining, based on images from the RFAS camera of the egg target, whether and to what extent the egg target is to be sprayed with oil;
  dispensing oil on the egg target by fluidly coupling the oil reservoir to the nozzle, the dispensing based on the images from the RFAS camera of the egg target; and
  determining an oiling efficiency based on the images of the egg target acquired by the camera of the RFAS, the images transmitted by the aerial vehicle to a ground monitor, and adjusting subsequent dispensing of oil responsive thereto.

2. The method of claim 1, wherein fluidly coupling the oil reservoir to the nozzle comprises adjusting an actuator coupled between the oil reservoir and the nozzle in response to a command from an operator station.

3. The method of claim 1, wherein dispensing the oil on the egg target includes generating a coherent and tight oil stream.

4. The method of claim 1, further comprising operating the aerial vehicle, the aerial vehicle further comprising:
a body with a plurality of rotors;
a controller;
a battery powering motors of the plurality of rotors;
an actuator to open and close the nozzle powered by the battery and coupled to the controller; and
a pressurized gas tank coupled to the oil reservoir and pressurizing the oil in the reservoir;
wherein the nozzle is coupled to the oil reservoir, and wherein the oil reservoir is positioned next to the drone camera on an underside of the aerial vehicle.

5. The method of claim 3, wherein there is no oil pump on board the aerial vehicle, and wherein there is no air pump on board the aerial vehicle, the aerial vehicle further comprising a pressure sensor coupled to the oil reservoir.

6. The method of claim 1, further comprising operating a laser, including providing a visual marker of a point that will be sprayed by the nozzle.

7. The method of claim 6, further comprising moving the point over an entire clutch of eggs while dispensing oil.

8. The method of claim 7, wherein the nozzle is mounted on the gimbal motor, the RFAS camera is mounted on the gimbal motor, and the laser is mounted on the gimbal motor such that they share a common gimbal pivot point and form a nozzle-camera-laser assembly, and wherein the method further includes operating the motor driven, remotely controlled gimbal motor to aim the nozzle-camera-laser assembly at the eggs in the clutch.

9. The method of claim 8, further comprising determining whether a sufficient number of eggs was covered with oil and whether an oil layer on targeted eggs was sufficiently thick via the RFAS camera.

10. The method of claim 1, further comprising adjusting a pitch axis of the RFAS as a target range varies to compensate for stream drop.

11. The method of claim 1, wherein oiling bird eggs includes oiling raven eggs of ravens preying on desert tortoises by the RFAS to control raven population, and the flying includes flying the aerial vehicle to the position near the egg target, the egg target being a nest with raven eggs of the ravens preying on desert tortoises.

12. A conservation method, comprising:
oiling bird eggs by a remote fluid application system (RFAS) to control avian pest species population, the RFAS coupled to an aerial vehicle, including:
loading an oil reservoir of the RFAS with oil and pressurized air;
operating an RFAS camera coupled in the RFAS;
flying the aerial vehicle to a position near an egg target, the aerial vehicle having a drone camera distinct from the RFAS camera;
remotely operating a gimbal motor of the RFAS to adjust a position of a nozzle and the RFAS camera of the RFAS to the egg target;
determining, based on images from the RFAS camera of the egg target, whether and to what extent the egg target is to be sprayed with oil; and
dispensing oil on the egg target by fluidly coupling the oil reservoir to the nozzle, the dispensing based on the images from the RFAS camera of the egg target, wherein oiling bird eggs includes oiling raven eggs of ravens preying on desert tortoises by the RFAS to control raven population, and the flying includes flying the aerial vehicle to the position near the egg target, the egg target being a nest with raven eggs of the ravens preying on desert tortoises.

13. The method of claim 12, wherein dispensing the oil on the egg target includes generating a coherent and tight oil stream.

14. The method of claim 12, further comprising determining an oiling efficiency based on the images of the egg target acquired by the camera of the RFAS, the images transmitted by the aerial vehicle to a ground monitor, and adjusting subsequent dispensing of oil responsive thereto.

15. A conservation method, comprising:
oiling bird eggs by a remote fluid application system (RFAS) to control avian pest species population, the RFAS coupled to an aerial vehicle, including:
loading an oil reservoir of the RFAS with oil and pressurized air;
operating an RFAS camera coupled in the RFAS;
flying the aerial vehicle to a position near an egg target, the aerial vehicle having a drone camera distinct from the RFAS camera;
remotely operating a gimbal motor of the RFAS to adjust a position of a nozzle and the RFAS camera of the RFAS to the egg target;
determining, based on images from the RFAS camera of the egg target, whether and to what extent the egg target is to be sprayed with oil;
dispensing oil on the egg target by fluidly coupling the oil reservoir to the nozzle, the dispensing based on the images from the RFAS camera of the egg target;
operating a laser, including providing a visual marker of a point that will be sprayed by the nozzle; and
moving the point over an entire clutch of eggs while dispensing oil, wherein the nozzle is mounted on the gimbal motor, the RFAS camera is mounted on the gimbal motor, and the laser is mounted on the gimbal motor such that they share a common gimbal pivot point and form a nozzle-camera-laser assembly, and wherein the method further includes operating the motor driven, remotely controlled gimbal motor to aim the nozzle-camera-laser assembly at the eggs in the clutch.

16. The method of claim 15, further comprising determining whether a sufficient number of eggs was covered with oil and whether an oil layer on targeted eggs was sufficiently thick via the RFAS camera.

* * * * *